United States Patent
Lang et al.

(10) Patent No.: US 9,432,365 B2
(45) Date of Patent: *Aug. 30, 2016

(54) STREAMING MUSIC USING AUTHENTICATION INFORMATION

(71) Applicant: Sonos, Inc., Santa Barbara, CA (US)

(72) Inventors: Jonathan P. Lang, Santa Barbara, CA (US); Paul Andrew Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,426

(22) Filed: Sep. 21, 2015

(65) Prior Publication Data

US 2016/0021085 A1  Jan. 21, 2016

Related U.S. Application Data

(63) Continuation of application No. 14/528,904, filed on Oct. 30, 2014, now Pat. No. 9,185,103, which is a continuation of application No. 13/630,616, filed on Sep. 28, 2012, now Pat. No. 8,910,265.

(51) Int. Cl.
*G06F 7/04* (2006.01)
*G06F 15/16* (2006.01)
(Continued)

(52) U.S. Cl.
CPC .............. *H04L 63/0853* (2013.01); *A61J 1/16* (2013.01); *G06F 3/165* (2013.01);
(Continued)

(58) Field of Classification Search
CPC .................................................. H04L 63/0853
USPC ............................................................ 726/9
See application file for complete search history.

(56) References Cited

U.S. PATENT DOCUMENTS 5,255,326 A  10/1993 Stevenson
5,598,278 A  1/1997 Tanaka et al.
(Continued)

FOREIGN PATENT DOCUMENTS

EP  1504367 A2  2/2005
EP  2478714 A1  7/2012
(Continued)

OTHER PUBLICATIONS

International Bureau, International Preliminary Report on Patentability, mailed on Apr. 9, 2015, issued in connection with International Application No. PCT/US2013/061710, filed on Sep. 25, 2013, 8 pages.

(Continued)

*Primary Examiner* — Dant Shaifer Harriman
(74) *Attorney, Agent, or Firm* — McDonnell Boehnen Hulbert & Berghoff LLP

(57) ABSTRACT

Techniques provided herein may facilitate set-up of an audio system with audio content services that have been previously registered on a second system. An example technique involves a computing device maintaining data representing a list of audio services from which an audio system can receive streaming music and data indicating that a first audio service is registered with the audio system. The device receives data indicating a second audio service added to the list of audio services. An application on the computing device may be configured to receive streaming music from the second audio service using particular authentication information. The device causes display of a graphical representation of the second service indicating that the particular authentication information is available from the application. The device may detect a selection of the second service and cause the audio system to receive streaming music from the second service using the particular authentication information.

20 Claims, 10 Drawing Sheets

(51) Int. Cl.

| | | |
|---|---|---|
| *G06F 17/30* | (2006.01) | |
| *H04L 29/06* | (2006.01) | |
| *H04N 21/258* | (2011.01) | |
| *H04N 21/436* | (2011.01) | |
| *H04N 21/462* | (2011.01) | |
| *H04N 21/475* | (2011.01) | |
| *H04N 21/485* | (2011.01) | |
| *H04N 21/6547* | (2011.01) | |
| *H04N 21/658* | (2011.01) | |
| *H04N 21/81* | (2011.01) | |
| *G06F 21/33* | (2013.01) | |
| *A61J 1/16* | (2006.01) | |
| *G06F 3/16* | (2006.01) | |
| *H04R 27/00* | (2006.01) | |
| *A61J 1/06* | (2006.01) | |
| *F25D 3/08* | (2006.01) | |
| *F25D 21/14* | (2006.01) | |

(52) U.S. Cl.
CPC ........ *G06F 17/3074* (2013.01); *G06F 21/335* (2013.01); *H04L 63/08* (2013.01); *H04L 65/1073* (2013.01); *H04L 65/4069* (2013.01); *H04L 65/4084* (2013.01); *H04L 65/60* (2013.01); *H04N 21/25875* (2013.01); *H04N 21/25891* (2013.01); *H04N 21/43615* (2013.01); *H04N 21/4622* (2013.01); *H04N 21/4753* (2013.01); *H04N 21/485* (2013.01); *H04N 21/6547* (2013.01); *H04N 21/6581* (2013.01); *H04N 21/8106* (2013.01); *H04N 21/8166* (2013.01); *H04R 27/00* (2013.01); *A61J 1/065* (2013.01); *B65D 2303/00* (2013.01); *F25D 3/08* (2013.01); *F25D 21/14* (2013.01); *F25D 2303/083* (2013.01); *F25D 2331/803* (2013.01); *F25D 2331/809* (2013.01); *F25D 2500/02* (2013.01); *G06F 2221/2137* (2013.01); *H04R 2227/005* (2013.01)

(56) References Cited

U.S. PATENT DOCUMENTS

| | | |
|---|---|---|
| 5,636,345 A | 6/1997 | Valdevit |
| 5,696,896 A | 12/1997 | Badovinatz et al. |
| 5,787,249 A | 7/1998 | Badovinatz et al. |
| 5,808,662 A | 9/1998 | Kinney et al. |
| 5,923,902 A | 7/1999 | Inagaki |
| 5,946,343 A | 8/1999 | Schotz et al. |
| 6,256,554 B1 | 7/2001 | Dilorenzo |
| 6,349,352 B1 | 2/2002 | Lea |
| 6,404,811 B1 | 6/2002 | Cvetko et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,662,231 B1 | 12/2003 | Drosset et al. |
| 6,757,517 B2 | 6/2004 | Chang |
| 6,778,869 B2 | 8/2004 | Champion |
| 6,839,752 B1 | 1/2005 | Miller et al. |
| 6,907,458 B2 | 6/2005 | Tomassetti et al. |
| 6,990,211 B2 | 1/2006 | Parker |
| 7,130,608 B2 | 10/2006 | Hollstrom et al. |
| 7,130,616 B2 | 10/2006 | Janik |
| 7,143,939 B2 | 12/2006 | Henzerling |
| 7,218,708 B2 | 5/2007 | Berezowski et al. |
| 7,236,739 B2 | 6/2007 | Chang |
| 7,236,773 B2 | 6/2007 | Thomas |
| 7,263,070 B1 | 8/2007 | Delker et al. |
| 7,266,840 B2 | 9/2007 | Gruber |
| 7,293,060 B2 | 11/2007 | Komsi |
| 7,334,043 B2 | 2/2008 | Daigle |
| 7,356,011 B1 | 4/2008 | Waters et al. |
| 7,412,499 B2 | 8/2008 | Chang et al. |
| 7,433,324 B2 | 10/2008 | Switzer et al. |
| 7,469,139 B2 | 12/2008 | Van de Groenendaal |
| 7,483,538 B2 | 1/2009 | McCarty et al. |
| 7,571,014 B1 | 8/2009 | Lambourne et al. |
| 7,643,894 B2 | 1/2010 | Braithwaite et al. |
| 7,657,910 B1 | 2/2010 | McAulay et al. |
| 7,668,990 B2 | 2/2010 | Krzyzanowski et al. |
| 7,669,219 B2 | 2/2010 | Scott, III |
| 7,835,689 B2 | 11/2010 | Goldberg et al. |
| 7,853,341 B2 | 12/2010 | McCarty et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,249,071 B2 | 8/2012 | Kreifeldt et al. |
| 8,280,076 B2 | 10/2012 | Devantier et al. |
| 8,290,603 B1 | 10/2012 | Lambourne |
| 8,326,951 B1 | 12/2012 | Millington et al. |
| 2001/0027498 A1 | 10/2001 | Van De Meulenhof et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0184310 A1 | 12/2002 | Traversat et al. |
| 2003/0055892 A1 | 3/2003 | Huitema et al. |
| 2003/0131226 A1 | 7/2003 | Spencer et al. |
| 2003/0157951 A1 | 8/2003 | Hasty |
| 2003/0204273 A1 | 10/2003 | Dinker et al. |
| 2003/0204509 A1 | 10/2003 | Dinker et al. |
| 2004/0024478 A1 | 2/2004 | Hans et al. |
| 2004/0133689 A1 | 7/2004 | Vasisht |
| 2004/0168081 A1 | 8/2004 | Ladas et al. |
| 2005/0170781 A1 | 8/2005 | Jacobsen et al. |
| 2005/0181348 A1 | 8/2005 | Carey et al. |
| 2005/0216556 A1 | 9/2005 | Manion et al. |
| 2005/0239445 A1 | 10/2005 | Karaoguz et al. |
| 2005/0262082 A1 | 11/2005 | Kushalnagar et al. |
| 2006/0095516 A1 | 5/2006 | Wijeratne |
| 2006/0142034 A1 | 6/2006 | Wentink et al. |
| 2006/0173976 A1 | 8/2006 | Vincent et al. |
| 2007/0022207 A1 | 1/2007 | Millington |
| 2007/0142944 A1 | 6/2007 | Goldberg et al. |
| 2007/0192156 A1 | 8/2007 | Gauger |
| 2008/0010652 A1 | 1/2008 | Booth |
| 2009/0138921 A1 | 5/2009 | Miyata |
| 2009/0304205 A1 | 12/2009 | Hardacker et al. |
| 2010/0036950 A1 | 2/2010 | Bae et al. |
| 2010/0260348 A1 | 10/2010 | Bhow et al. |
| 2013/0014232 A1 | 1/2013 | Louboutin et al. |

FOREIGN PATENT DOCUMENTS

| | | |
|---|---|---|
| KR | 20100062799 | 6/2010 |
| WO | 0153994 A2 | 7/2001 |
| WO | 2012030733 A1 | 3/2012 |

OTHER PUBLICATIONS

Advisory Action mailed on Jun. 9, 2014, issued in connection with U.S. Appl. No. 13/630616, filed Sep. 28, 2012, 4 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

"Bluetooth. "Specification of the Bluetooth System: The ad hoc SCATTERNET for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Dell, Inc. "Dell Digital Audio Receiver: Reference Guide" Jun. 2000, 70 pages".

"Dell, Inc. "Start Here" Jun. 2000, 2 pages".

(56) References Cited

OTHER PUBLICATIONS

"European Search Report mailed on Sep. 2, 2015, issued in connection with European Patent Application No. 13841946.0, 7 pages".
"Final Office Action mailed on Apr. 3, 2014, issued in connection with U.S. Appl. No. 13/630,616, filed Sep. 28, 2012, 22 pages".
"International Search Report mailed on Jan. 17, 2014 for PCT/US2013/061710 filed Sep. 25, 2013."
Jo J., et al., "Synchronized One-to-many Media Streaming with Adaptive Playout Control," Proceedings of SPIE, 2002, vol. 4861, pp. 71-82.
"Jones, Stephen. "Dell Digital Audio Receiver: Digital upgrade for your analog stereo" Analog Stereo. Jun. 24, 2000 retrieved Jun. 18, 2014, 2 pages".
"Louderback, Jim. "Affordable Audio Receiver Furnishes Homes With MP3" TechTV Vault. Jun. 28, 2000 retrieved Jul. 10, 2014, 2 pages".
"Non-Final Office Action mailed Nov. 5, 2013 for U.S. Appl. No. 13/630,616, filed Sep. 28, 2012".
"Notice of Allowance mailed on Sep. 25, 2014, issued in connection with U.S. Appl. No. 13/630,616, filed Sep. 28, 2014, 11 pages".
"Palm, Inc. "Handbook for the Palm VII Handheld" May 2000, 311 pages".
"Presentations at WinHEC 2000" May 2000, 138 pages.
PRISMIQ; Inc., "PRISMIQ Media Player User Guide", 2003, 44 pages
"UPnP; "Universal Plug and Play Device Architecture"; Jun. 8, 2000; version 1.0; Microsoft Corporation; pp. 1-54".
"Written Opinion of the International Searching Authority mailed on Jan. 17, 2014 for PCT/US2013/061710 filed Sep. 25, 2013."

US 9,432,365 B2

STREAMING MUSIC USING AUTHENTICATION INFORMATION

CROSS REFERENCE TO RELATED APPLICATIONS

This application is a continuation of U.S. application Ser. No. 14/528,904, filed on Oct. 30, 2014, which is hereby incorporated by reference in its entirety. U.S. application Ser. No. 14/528,904 is a continuation of U.S. application Ser. No. 13/630,616, filed Sep. 28, 2012 and issued as U.S. Pat. No. 8,910,265, which is hereby incorporated by reference in its entirety.

FIELD OF THE DISCLOSURE

The disclosure is related to consumer goods and, more particularly, to methods, systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
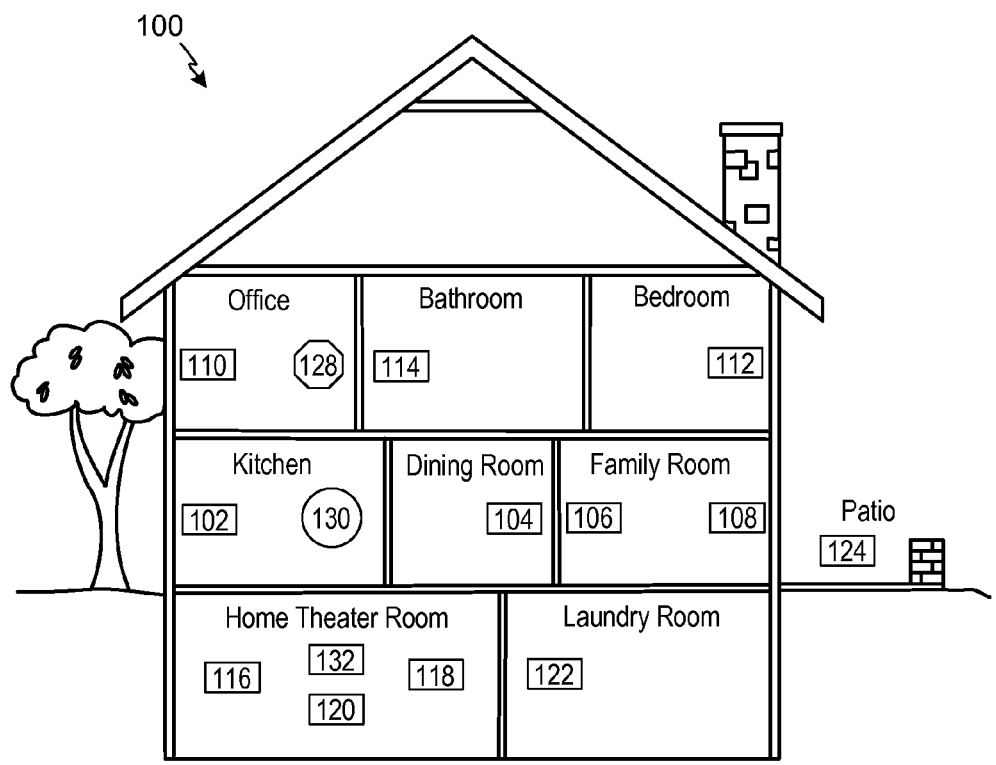
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Listening to audio content out loud can be a social activity that involves family, friends, or both. Audio content may include, for instance, music, talk radio, books, audio from television, and other audible material. For example, in a household, people may play music out loud at parties and other social gatherings. In such an environment, people may wish to play the music in one listening zone or multiple listening zones simultaneously, such that the music in each listening zone may be synchronized, without audible echoes or glitches. Listening to audio content out loud can also be an individual experience. For example, an individual may play music out loud for themselves in the morning before work, in the evening during dinner, or at other times throughout the day at home, work, or on the road. For these individual experiences, the individual may choose to either use headphones or limit the out loud playback of audio content to a single zone or area.

In one example, an audio system may include one or more audio players, often referred to herein as zone players or playback devices or players, and controllers, which may also be a player in some instances. A controller may be used to control the audio system, and can include capabilities for, among other things, browsing and selecting audio content for playback, viewing and editing audio content in one or more playback queues, or grouping and ungrouping zone players into one or more listening zones, etc. According to an embodiment, the audio system may operate as a distributed system such that each controller has full control over the entire audio system, and each player has the ability to play audio content from either a same audio source or a different audio source as another player.

In one case, the different audio sources may be different audio content services available over the Internet. Each of the variety of audio content services may offer a different audio content experience. For example, some audio content services may provide seemingly infinite music libraries for a user to explore, while some other audio content services provide automatically generated playlists according to the user's preferences. Accordingly, a user of the audio system may be registered with more than one audio content service, and may wish to setup the audio system with each of the audio content services the user is registered with.

In one case, during setup of the audio system, the user may be provided with a list of audio content services supported by the audio system. While such a setup may provide the user with a comprehensive list of options for the user to explore, the user may need to look through the potentially long list of supported audio content services to find the audio content services the user is already registered with, and may wish to setup with the audio system. In some cases, this may be cumbersome. As such, the present application provides methods and systems for assisting the user with setting up the audio system with audio content services the user is registered with, such that the user may spend less time configuring the audio system, and begin enjoying audio content sooner.

Example systems, methods, apparatus, and articles of manufacture disclosed and described herein to detect and register audio services with an audio system. In some embodiments, a first audio service is selected from a list of a plurality of audio services supported by an audio system. A determination is made that a first application corresponding to the first audio service is present on a computing device associated with the audio system. The first audio service is registered with the audio system based on the determination that the first application is present on the computing device.

Many other embodiments are provided and described herein.

II. Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. The system configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
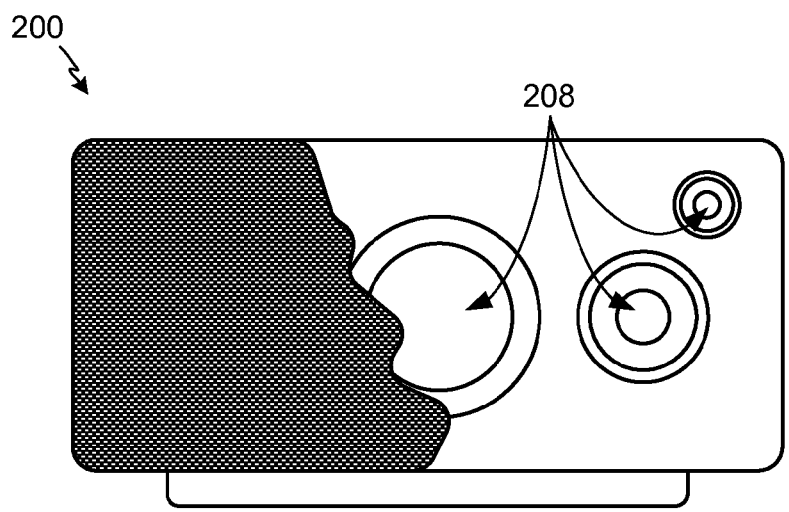
FIG. 2A shows an illustration of an example zone player having a built-in amplifier and transducers.
Figure 2B:
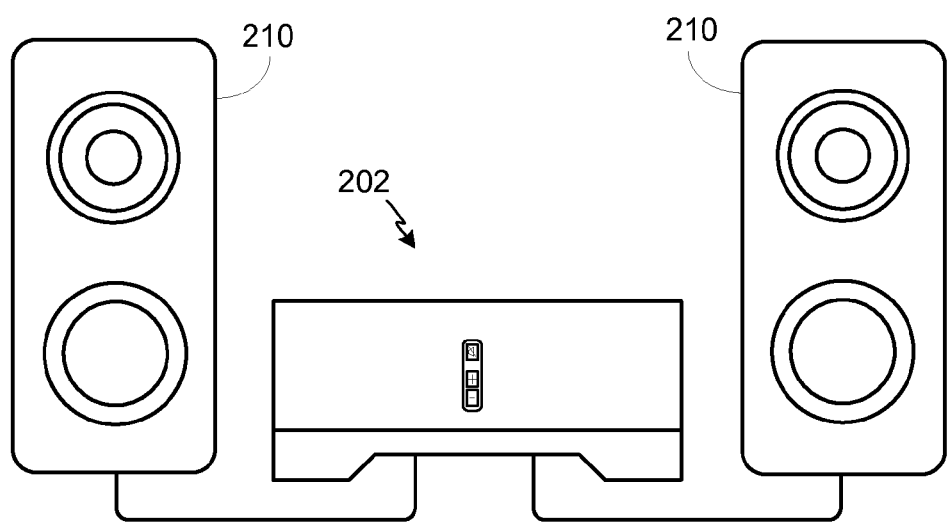
FIG. 2B shows an illustration of an example zone player having a built-in amplifier and connected to external speakers.
Figure 2C:
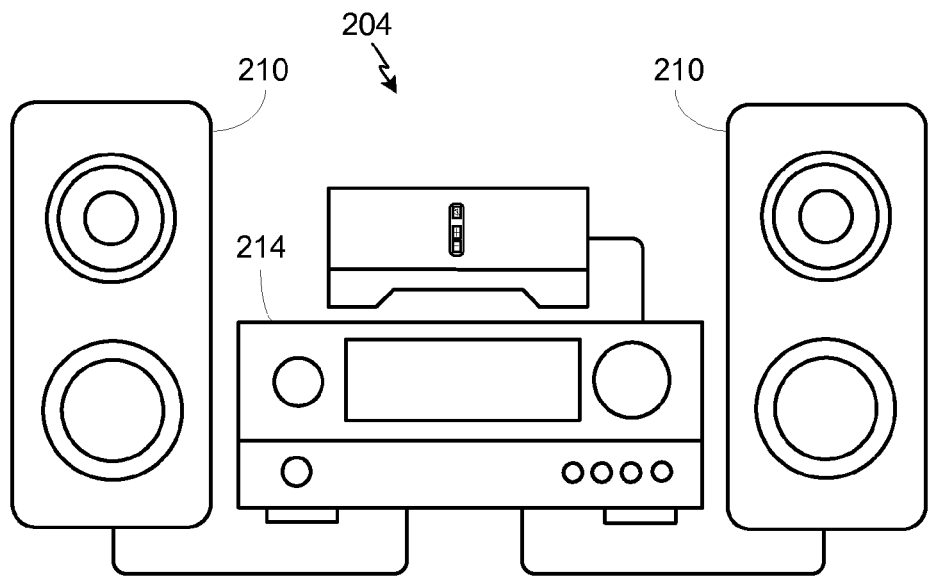
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
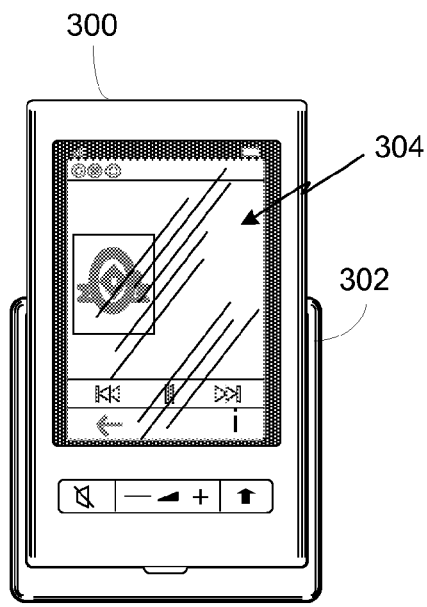
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
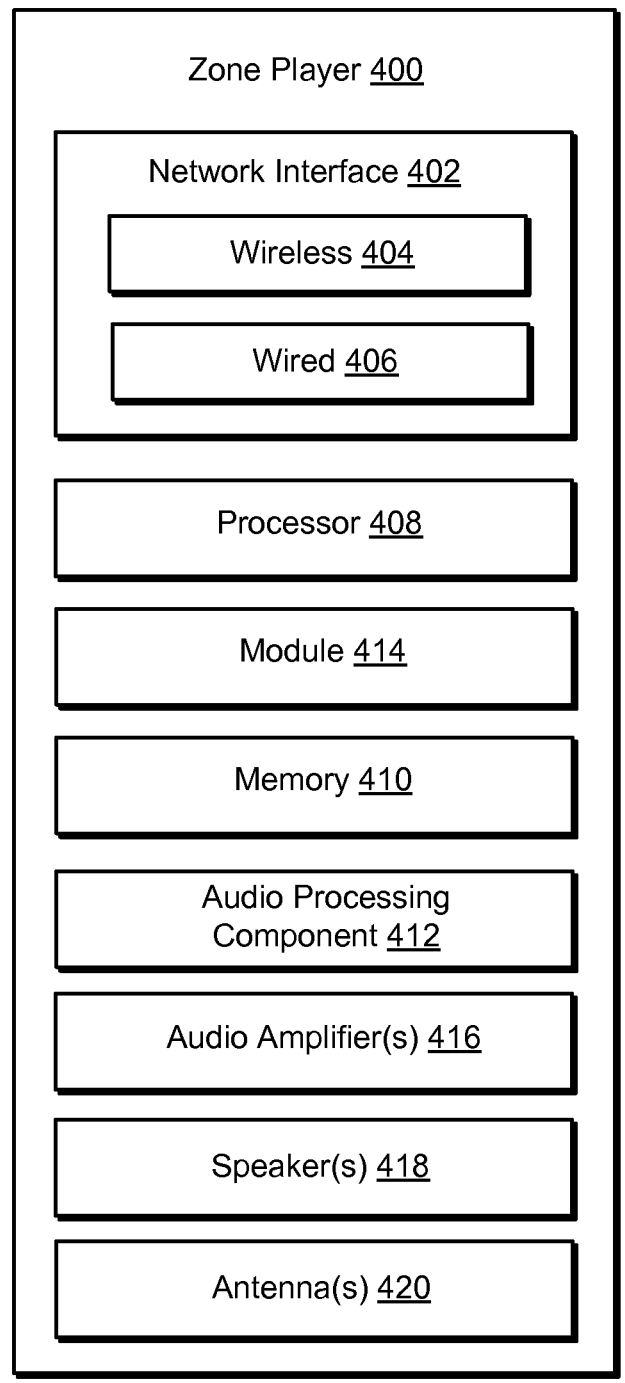
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
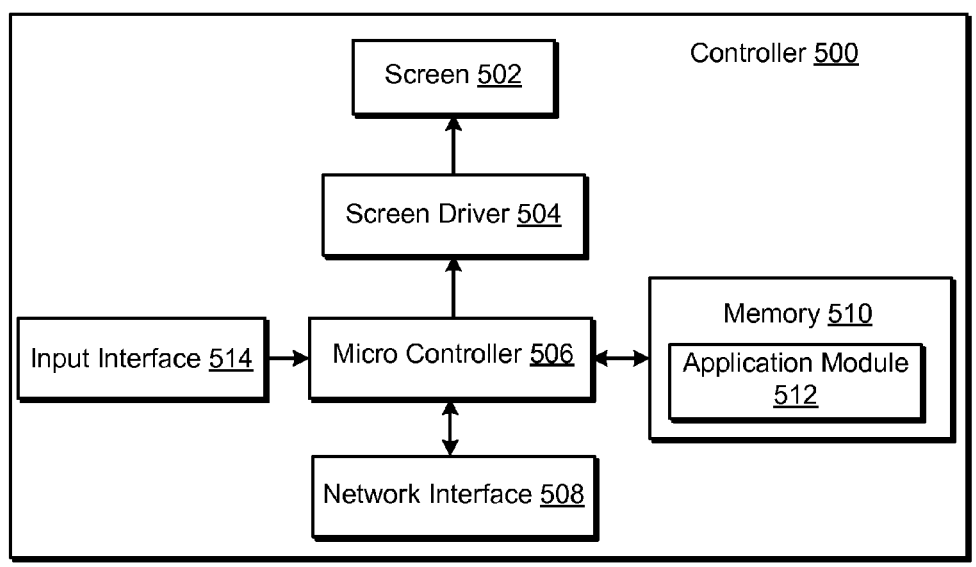
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
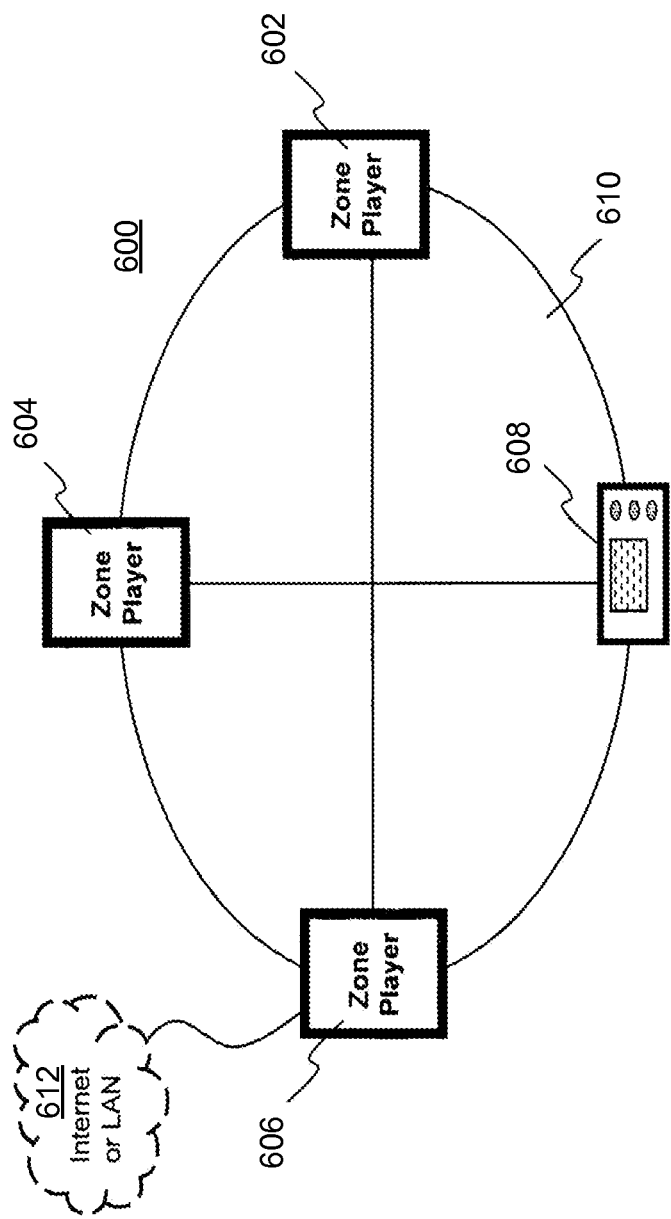
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
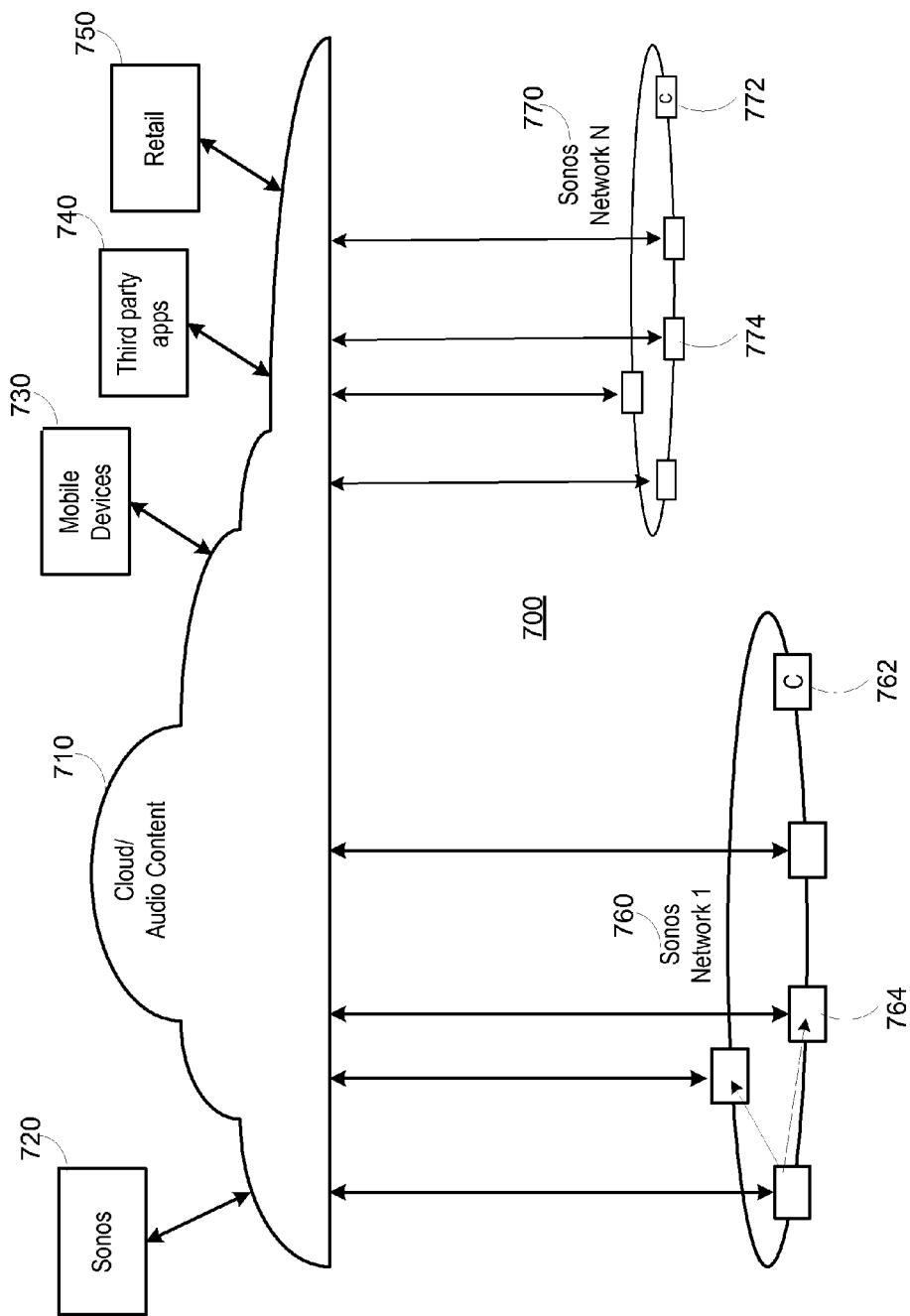
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia audio system 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Method for Audio Content Playback Management

In some embodiments of the present application, methods and systems are provided for assisting the user with setting up an audio system with audio content services the user is registered with and/or already uses. In particular, the assisted registration of audio content services with the audio system may be based on automatically detecting audio content service applications on a personal device such as a mobile phone, tablet, PC, MAC™, smart TV, and so on. In one example, in addition to automatically detecting audio content service applications on the personal device, content from the personal device may also be automatically added to a music library for playback in an audio system based on auto-detecting the local content on a personal device.

As discussed above, an example audio system of the present application may provide support for multiple audio sources, and the multiple audio sources may be accessed by a user of the system using an audio system controller. The example audio system may be flexible and dynamic, and may support audio playback of content that is both local and remote. In one example, the local audio content may include audio content that may be accessed from a local area network (LAN) such as audio content stored on a personal device (e.g., such as a mobile phone, wireless tablet, PC, MAC™, smart TV, and so on) or a network attached storage (NAS) device. In another example, the remote audio content may include audio content that may be accessed from a "cloud network" (i.e., over the Internet) such as from streaming audio content services or cloud-based music storage services.

Example streaming services may include both registration-based services (e.g., RHAPSODY®, PANDORA®, SPOTIFY®, SONGZA®, and so on) and registration-free services (e.g., Internet radio services such as NPR®, SOMAFM®, and so on). Streaming audio content service applications may often provide a personal and tailored listening experience, either through explicit registration, often requiring a sign-in procedure including, for example, a username, a password, or a username/password combination, or through implicit registration using, for example, configurable settings on the personal device. Either way, it is common for people to customize their experience, for example, by creating their own "stations" or "libraries" within a particular service.

In one example, a controller such as the controller 300 or 500 described above may be used to setup and control the audio system. The controller may be in the form of a dedicated controller (such as, for example, the SONOS® Controller, the SONOS® CR200, and SONOS® CR100 devices) or in the form of a software application (i.e., Controller application) that have been installed on another device (such as, for example, the SONOS® Controller for the IPHONE™, the SONOS® Controller for the IPAD™, the SONOS® Controller for ANDROID™, etc.). The setup of the audio system may involve adding access to audio content services by the audio system, including personalized audio content services, Internet radio, local or remote music library, etc. This may be done when the audio system is first setup, as well as over time as new services or audio content become available.

Figure 8A:
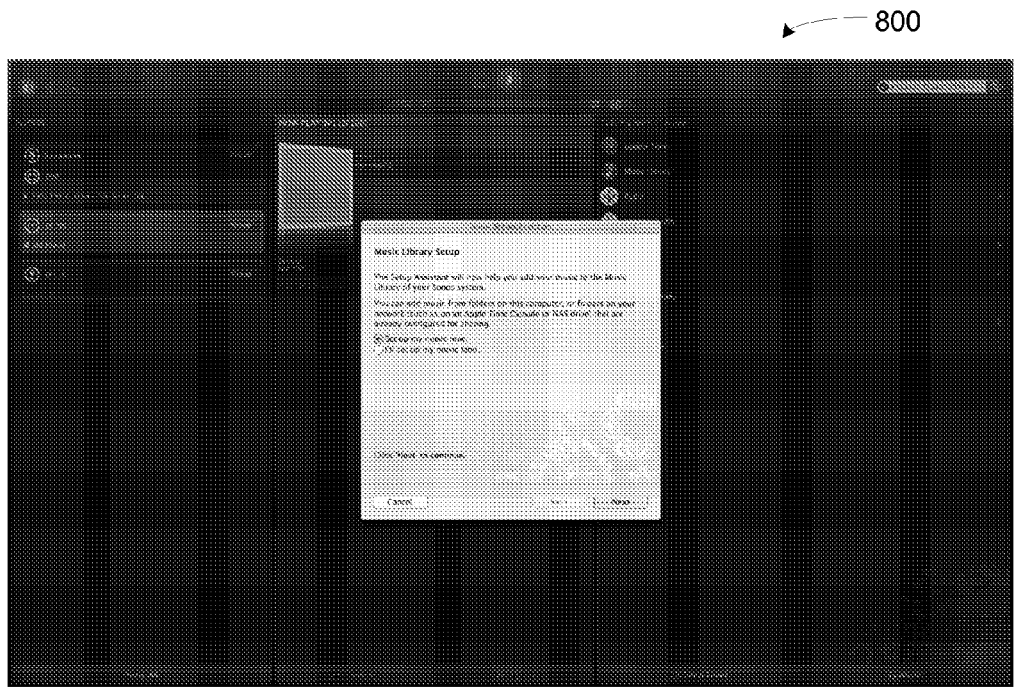
FIG. 8A shows an example audio system user interface prompting a user to setup audio services for the audio system.
Figure 8B:
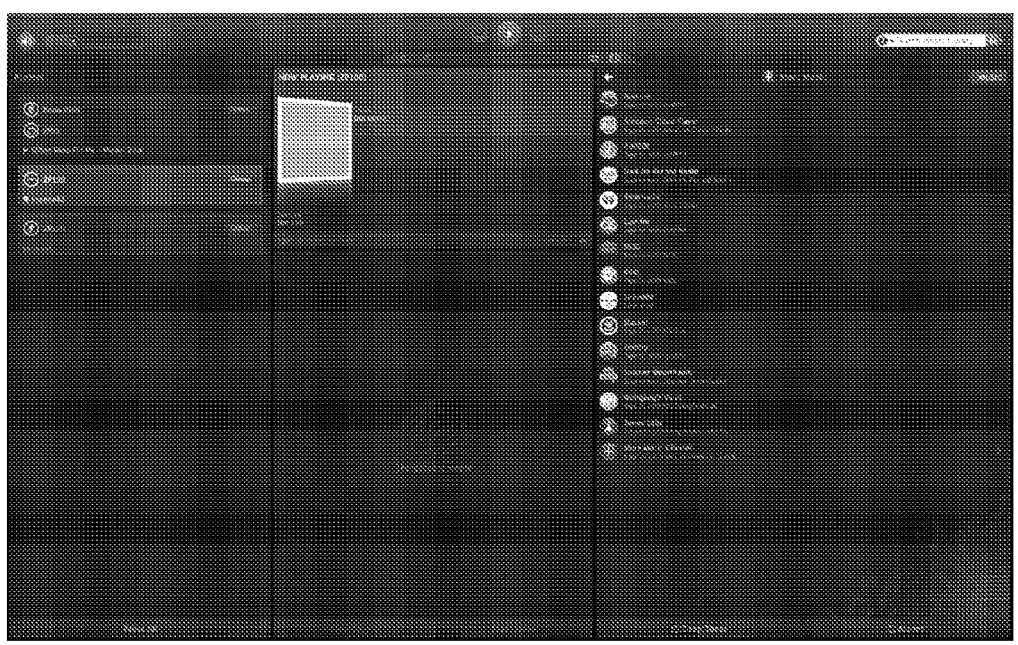
FIG. 8B shows an example audio system user interface listing audio services supported by the audio system.

In one example, as shown in FIG. 8A, when a user uses a controller to setup the audio system for the first time, the user may be prompted via an interface of the controller to indicate whether the audio system should begin adding audio content associated with the user to a music library for the audio system to render. If the user indicates that the audio system should begin adding audio content associated with the user to the music library, a list of audio content services supported by the audio system may be provided, as shown in FIG. 8B. The list of supported audio content services may include audio content services that may also be accessed by the user via software applications specific to the respective audio content services (in addition to a controller application for the audio system in the case the audio content service is supported).

In a traditional system, the controller application may provide a list of supported audio content services to the user such that the user may select an audio content service and register, if necessary, that service with the audio system. The registration process may include, for example, entering a username/password combination for that service. In some cases, this process may be cumbersome. For instance, the list may be unduly long (often requiring extension elements in the list such as "More Music" as shown in FIG. 8B), the presentation of the list of available services may not take into consideration musical preferences of the user, or the registration process may require entering information from the user.

In one example embodiment, the controller application may be one of many applications on a personal device (e.g., the SONOS® Controller for the IPHONE™, the SONOS® Controller for the PC, etc.). Other applications on the personal device may include audio content service applications that playback streaming content (e.g., RHAPSODY®, PANDORA®, SPOTIFY®, SONGZA, NPR, etc.) as well as audio content service applications that provide access to a local library of music on the personal device (e.g., ITUNES™). Users may add new applications over time as they learn about other services or content.

As mentioned previously, the controller application may automatically discover applications specific to one or more of the supported audio content services that have been installed on the personal device. In other words, the controller application may determine which of the supported audio content services the user already uses via the personal device.

In one case, the controller application, when presenting the list of supported audio content services, may take into consideration the discovered applications. In one instance, the audio content services corresponding to the discovered applications may be listed first in the list of supported audio content service. In another instance, the audio content services may be listed according to how frequent a user may have used the corresponding discovered applications.

In another case, the controller application may automatically, or semi-automatically, register supported audio content services with the audio system based on the discovered applications. In one example embodiment, the controller application may check the personal device for supported audio content services during a "music setup" phase of the audio system, as indicated above. For example, a "music setup" phase may be used to add music services and music libraries to the audio system. In another example embodiment, the controller application may check the personal device for the supported audio content services when a controller device is added to the audio system. For example, if a user adds a new controller device to the system (e.g., a new controller application on a personal device), then the new controller application may check the personal device for the supported audio content services when the controller device is added. In yet another example embodiment, the controller application may check the personal device for the supported audio content services when the controller application is started or on a periodic basis while the application is running on the personal device. Whichever the case, embodiments for checking the personal device for supported audio content services used by the user and the automatic or semi-automatic registration of the audio content services to the audio system are further discussed in more detail below.

Figure 9:
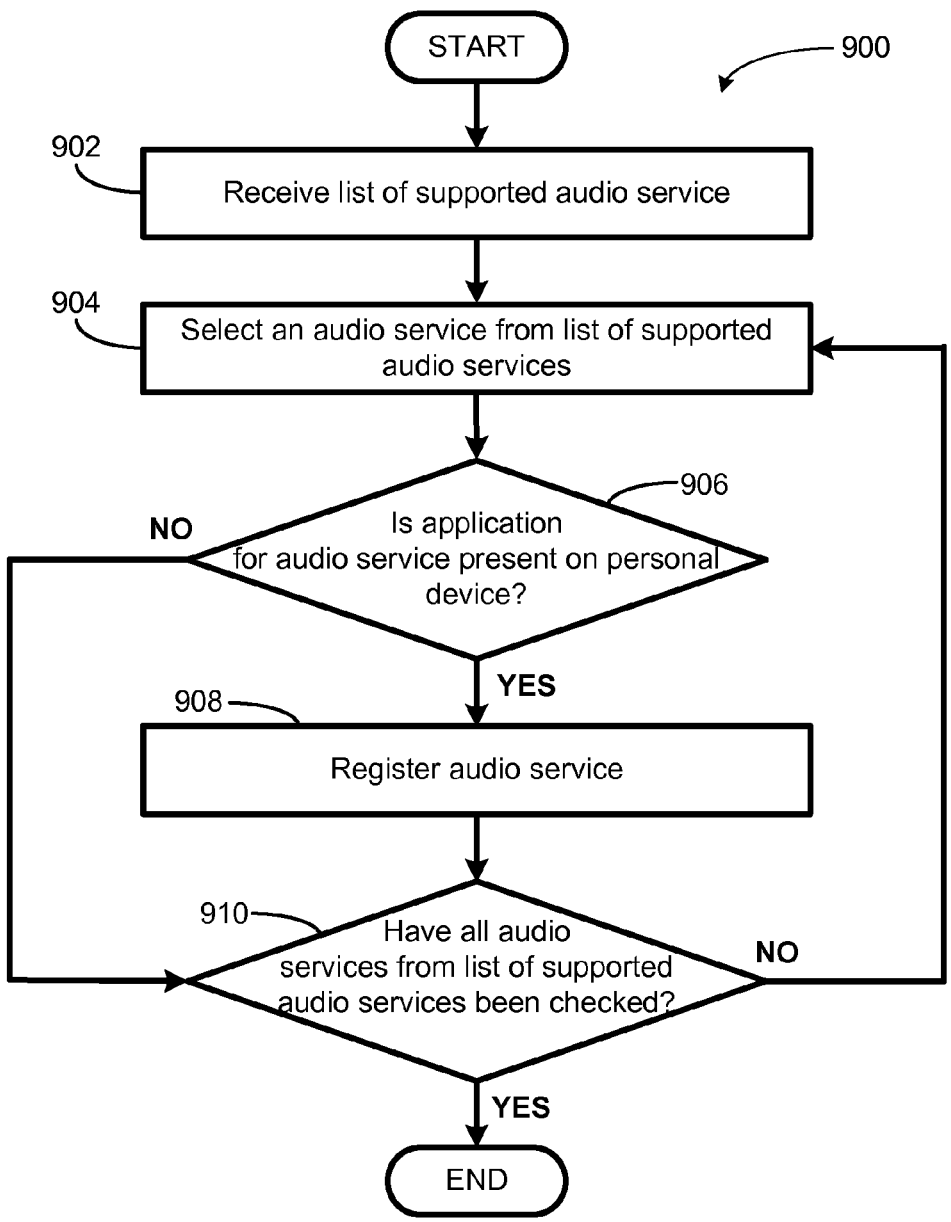
FIG. 9 shows an example flow diagram for registering audio services with an audio system.

FIG. 9 shows an example flow diagram for an example method 900 for registering audio content services with an audio system, in accordance with at least some embodiments described herein. Method 900 shown in FIG. 9 presents an embodiment of a method that could be used in the environment 100 with the systems 200, 202, 204, 300, 400, and 500 for example, in communication with a device, such as devices illustrated in FIGS. 2-5. Method 900 may include one or more operations, functions, or actions as illustrated by one or more of blocks 902-910. As illustrated, blocks 902, 904, and 908 are action blocks, and blocks 906 and 908 are decision blocks. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, the method 900 may involve receiving a list of supported audio content services. The list of supported services may be stored locally on the personal device or remotely on another control device, a playback device, a storage device (e.g., PC, Mac™, NAS, etc.), a local network, the "cloud network" over the Internet, or any combination thereof. The list of supported audio content services may change over time, for example, due to changes in business relationships or the introduction of new services. Accordingly, the list may be updated as the supported audio content services change.

In one example, the personal device may query the audio system for the list of supported audio content services upon receiving indication to begin adding audio content associated with the user to the music library. In one case, the audio system may provide the list to the personal device if the list is stored on the audio system. In another case, the audio system may relay the list from where the list is stored, to the personal device. In yet another case, the audio system may couple the personal device with where the list is stored such that the personal device may receive the list of supported audio content services. In other examples, the personal device may be configured to query where the list is stored directly to retrieve the list of supported audio content services.

At block 904, the method 900 involves selecting an audio content service from the list of supported audio content services. In one example, the audio content service may be selected based on the position of the audio content service on the list. For instance, an audio content service from the top of the list of supported audio content services may be selected first, and an audio content service at the bottom of the list of supported audio content services may be selected last. In another example, the audio content service may be selected based on alphabetical order of the audio content service.

At block 906, the method 900 involves making a determination as to whether an application associated with the selected audio content service is present on the personal device. In one example, determining that the application corresponding to the selected audio content service is present on a computing device associated with the audio system may involve determining an application identifier corresponding to the selected audio content service, comparing the application identifier against a list of application identifiers corresponding to applications present on the computing device, and determining that the application identifier matches one of application identifiers on the list of application identifiers corresponding to applications present on the computing device.

For instance, audio content service application discovery may entail checking a registry or list of applications installed on the personal device for audio content service applications that are on the list of supported audio content services. In one example embodiment, the list of supported audio content services maintained by the system may include application identifiers corresponding to each audio content service. These identifiers (or portions thereof) may be the same as those used in the registry of the personal device. As such, a comparison can be made between an identifier for an audio content service in the list of supported audio content services and the registry to determine if there is a match. In an illustrative example, the following system call with, for example, SPOTIFY™ ID equal to "com.spotify.mobile.android.ui" may be used to determine if the SPOTIFY™ application is installed on the ANDROID™ device:

ApplicationInfo info=getPackageManager( )
getApplicationInfo("com.spotify.mobile.android.ui", 0);
return appInfo !=null && appInfo.enabled;

In the case a "true" result is received in return, a determination may be made that the SPOTIFY™ application is installed, while in the case a "false" result is received in return, a determination may be made that the SPOTIFY™ application is not installed.

In another instance, determining that an application corresponding to the first audio content service is present on a computing device associated with the audio system may involve determining an application identifier corresponding to the selected audio content service, executing a system call to request service associated with the first application, receiving a response to the system call, and determining that the response indicates the first application is present on the computing device.

For instance, some personal device operating systems (e.g., the IOS™ operating system from APPLE Inc.) may not publish (or make available to other applications) a readable registry of the installed applications. As such, checking the personal device for applications matching those on the list of supported audio content services may involve using a message exchange protocol. In one case, the controller application may use a protocol (e.g., URL protocol) to test for the presence of a supported audio content service on the personal device. For example, the controller application may use the following system call to determine if the SPOTIFY™ application is installed on the IOS™ device:

NSURL *appURL=[NSURL urlFromString:@"spotify://"];
if ([[UIApplication sharedApplication] canOpenURL:appURL]){
// Application found
}

In this case, if a valid response is received, then a determination may be made that the SPOTIFY™ application is installed.

If at block 906, a determination is made that the selected application is not present on the personal device, the method 900 may proceed back to block 904 (via block 910, discussed below) to select another audio content service from the list of supported audio content services. Otherwise, upon determination that an application associated with the selected audio content service is present on the personal device, the method 900 may proceed to block 908, which may involve registering the audio content service with the audio system. As suggested previously, registering the audio content service with the audio system may be based on the determination that the application is present on the personal device. In one example, registering the audio content service with the audio system may further involve determining access requirements for registering the first audio content service with the audio system, receiving authentication information associated with a user of the audio system, and registering the first audio content service with the audio system according to the received authentication information.

In one example, access requirements may be required before an audio content service can be used in the audio system. For instance, the access requirements may include authentication information used to identify a user's account so that the audio system can provide access to personalized content or settings, and/or to provide access to "paid" features within an audio content service. In one case, the audio system may use a central server to register the audio system with the audio content service. In this case, the central server may act as a broker for the audio system to enable playback of audio content in the system. In another case, the authentication information may be propagated to playback and/or control devices in the audio system, so that each device may contact the audio content service directly.

In one example, receiving authentication information associated with a user of the audio system may involve prompting the user to provide authentication information via an interface of the audio system such as the controller application. In this case, the authentication information may be received via the controller applications.

For instance, when attempting to register an audio content service with the audio system, the audio system may prompt, via the controller application for authentication information to be entered. As such, a user using the controller application may input the authentication information to enable the audio system to access the user's audio content services. In one example, the registration information may include a username, a password, or a username/password combination. Once entered by the user, the authentication information may be stored in a secure location so that the audio system may use the registration information to access the account directly from the audio content service. The authentication information may be stored, for example, on a control device, on a playback device, on a storage device (e.g., PC, Mac™, NAS, etc.) on the local network, in the "cloud" over the Internet, or any combination thereof.

In another example, registering the audio content service with the audio system may involve receiving an authentication "token" from the first application corresponding to the first audio content service, and registering the first audio content service with the audio system according to the received authentication token.

In one example, where a token-based authentication mechanism is implemented, the user may not be required to enter credentials. Instead, the controller application may interact with the audio content service application for the audio content service, and receive from the audio content service application a corresponding authentication token, or unique identifier that references the user account. The audio system may then use the token to access the account directly from the audio content service. In one example embodiment, the token may have a duration of validity (e.g., 15 min, 1 hour, 4 hours, 8 hours, 1 month, etc.) and must be renewed periodically by the audio content service application. The controller may initiate the renewal by querying the audio content service application for a new token when a current token has expired, or the audio content service application may periodically refresh the token to the controller application. Other renewal procedures exist.

In another example embodiment, the token may be valid as long as the controller is a part of the system. For example, the controller may periodically (e.g., once a day, once a week, etc.) register itself with the audio system such that services that were added to the system via the controller are maintained. In another example embodiment, the token validity may be determined using a combination of these mechanisms.

In one case, different registration mechanisms may be available for a controller application and the associated audio system such that the different registration mechanisms may be applied according to different scenarios. In a home setup scenario, registration by having a user enter authentication information may be appropriate. In another scenario, the time-based token authentication (or credential) mechanism discussed above may be appropriate because it may allow users to temporarily use their audio content services on an audio system. In particular, in a retail (or Point of Sale) environment, such a mechanism would allow a potential customer to "test" the system in a personal way using their own audio content, without having to remove their account credentials when they are done trying out the system. In addition, not having to enter potentially sensitive username or password information might encourage more user participation in a shared retail environment. Further, in a home or personal environment, a time-based token mechanism allows guests to use their audio content services while they are using the system.

Referring back to block 910, upon registering the selected audio content service with the audio system, block 910 may involve making a determination as to whether all audio content services in the list of supported audio content services have been checked (or selected at least once for potential registration). If a determination is made that not all audio content services in the list have been checked, then the method 900 may proceed back to block 904 to select another, not previously selected audio content service. If a determination is made that all audio content services in the list have been checked, then the registration of audio content services with the audio system may be complete.

In one embodiment, the ability to automatically add audio content services to an audio system can simplify the audio setup of such a system. In one example, as described above, the controller application may discover multiple audio content service applications that are present on the personal device and automatically register each of the audio content services with the audio system. In the case token authentication is used, registration of the audio content services may further be done without any user interaction.

Figure 10:
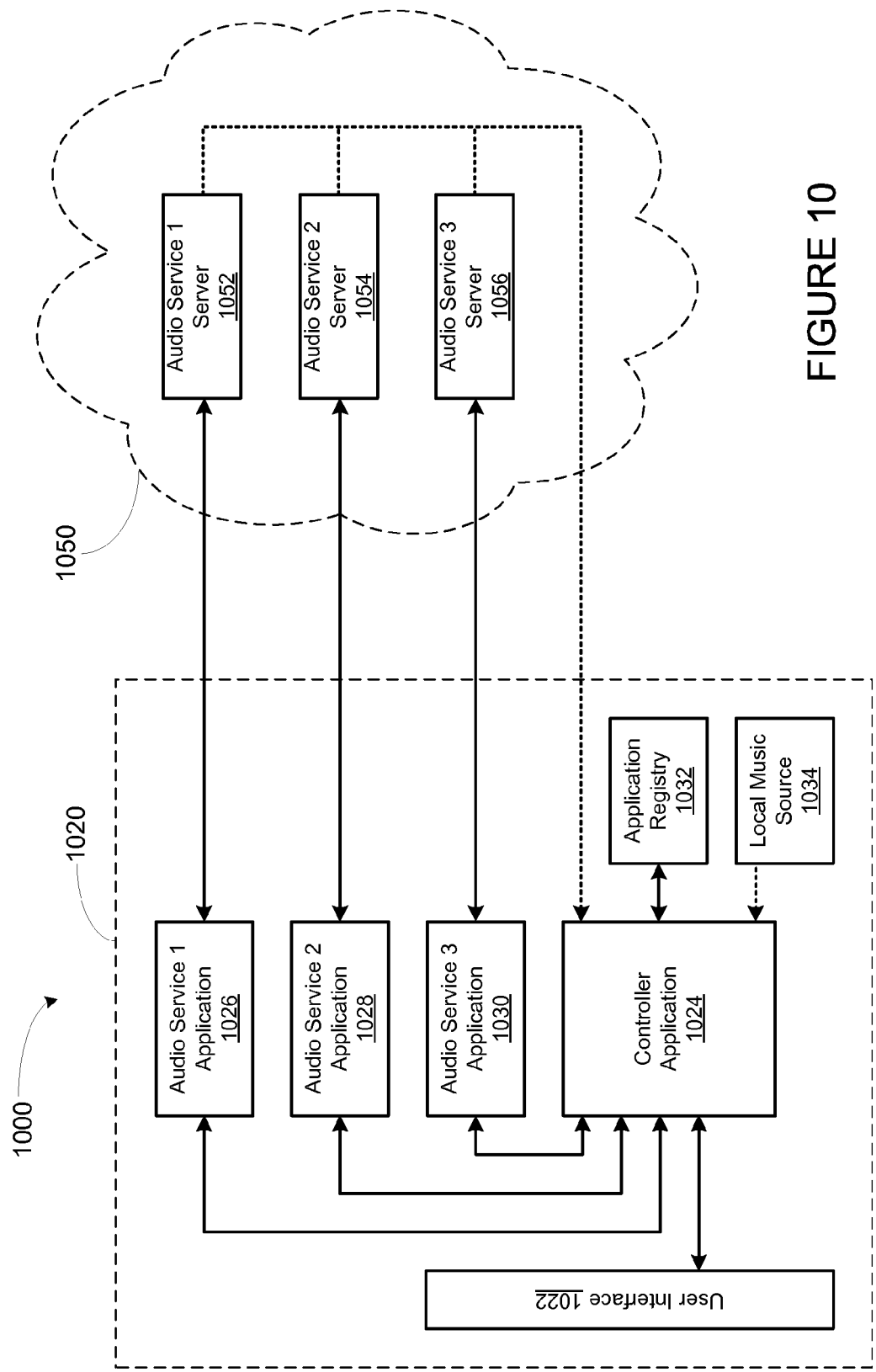
FIG. 10 shows an example block diagram of an interface between a controller device and audio services.

FIG. 10 shows an example block diagram of an example communication interface between a personal device 1020 and audio content services in a cloud network 1050. As shown in FIG. 10, the personal device 1020 may include a user interface 1022 in communication with a controller application 1024. The controller application 1024 may be in communication with a local music source 1034, and may add content from the local music source 1034 to the audio system for playback. The controller application 1024 may also be in communication with an application registry 1032 listing all the applications installed on the personal device. As such, the application registry 1032 may be accessed for determining whether an audio content service application, such as audio service 1 application 1026, audio service 2 application 1028, or audio service 3 application 1030 is present on the personal device 1020. The controller application 1024 may then be in communication with audio service 1 application 1026, audio service 2 application 1028, audio service 3 application 1030 to retrieve information needed for registering the audio system associated with the controller application 1024 with corresponding audio service servers 1052, 1054, and 1056 as shown in the cloud network 1050. The retrieved information, as discussed previously, may include user account information, or token-based authentication information.

As shown in FIG. 10, the user interface 1022 generally interacts with only the controller application 1024, thereby illustrating that a user may access all the local audio content as well as the supported and available audio content services in the cloud network through a single application on the personal device. Further, as discussed above, the controller application 1024 may be configured to communicate with the supported and available audio content services in the cloud network via the audio content service applications on the personal device 1020, thereby simplifying and expediting the setting up of an audio system with audio content services a user may already be registered with and enjoying.

Once an audio content service is registered with the audio system, content from the registered audio content service may become available for rendering by the audio system. In one example, the content may be available to any user of the audio system. For instance, the audio content service may be available to any user of the audio system and may appear as a system service, rather than an individual service. In an illustrative example, while an individual's RHAPSODY® service that has been added to the audio system may appear as a RHAPSODY® service on the user interface of the controller application, individual preferences such as "My Artists," "My Albums," or "My Channels" may be retained and available. In another example, the local library of the personal device that has been added to the audio system may be indexed and displayed in the "music library," intermixed with other audio content stored in other locations on the network. In these examples, any user with access to the audio system may access the content provided by the RHAPSODY® service or by the local library.

In another example, content from the registered audio content service may become available to only a subset of the users of the audio system. For instance, an audio content service, once added to the audio system, may only be available to the user who added the audio source. In an illustrative example, the controller that was used to add the audio content service to the system may be used to identify the user, and only users using the particular controller may be allowed to access those audio content sources.

In either example, the controller application and audio system may be configured such that any user of the audio system may modify account preferences or influence the audio preferences of the accessed account by selecting tracks or stations within the account. For example, when using the RHAPSODY® service, any user of the audio system may modify the content of their personalized music library (i.e., "My Library") by selecting "Add Album to My Library," "Add Track to My Library," and so on, whether or not the particular user is the user the RHAPSODY® service account is registered to. On the other hand, in another case, the controller application and audio system may be configured such that only the "account owner" may modify or influence the preferences.

VIII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, during setup of an audio system with audio content services, audio content services a user is registered with may be determined based on audio content service applications present on the user's controller device. In one case, the determined audio content services may then be provided to the user during setup visually ahead of other available audio content services for the user to select. In another case, the determined audio content services may be automatically registered. In either case, as a result of the assisted audio content service setup, the user may spend less time configuring the audio system, and begin enjoying audio content sooner. In addition, while the above embodiments apply generally to registrations of audio content services with an audio system, one having ordinary skill in the art will appreciate that the disclosed concepts may also be applied towards registration of video content services, such as NETFLIX® and HULU® with multimedia systems, which may include or be coupled with audio systems such as those discussed herein.

In one aspect, a method is provided. The method involves receiving a list of a plurality of audio services supported by an audio system, selecting a first audio service from the list of plurality of audio services, determining that a first application corresponding to the first audio service is present on a computing device associated with the audio system, and causing the first audio service to be registered with the audio system based on the determination that the first application is present on the computing device.

In another aspect, a system is provided. The system includes at least one processor, a non-transitory computer readable medium, and program instructions stored on the non-transitory computer readable medium. The program instructions are executable by the at least one processor to perform functions including receiving a list of a plurality of audio services supported by an audio system, selecting a first audio service from the list of plurality of audio services, determining that a first application corresponding to the first audio service is present on a computing device associated with the audio system, and causing the first audio service to be registered with the audio system based on the determination that the first application is present on the computing device.

In yet another aspect, a non-transitory computer readable medium having instructions stored thereon is provided. The instructions are executable by a computing device to cause the computing device to perform functions including receiving a list of a plurality of audio services supported by an audio system, selecting a first audio service from the list of plurality of audio services, determining that a first application corresponding to the first audio service is present on a computing device associated with the audio system, and causing the first audio service to be registered with the audio system based on the determination that the first application is present on the computing device.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
    maintaining, by a computing device, (i) data representing a list of audio services from which an audio system can receive streaming music and (ii) data indicating that a first audio service is registered with the audio system, wherein the list of audio services includes at least the first audio service;
    receiving, by the computing device, data indicating a second audio service added to the list of audio services, wherein an application on the computing device is configured to receive streaming music from the second audio service using particular authentication information;
    providing, for display on a graphical interface of the computing device, a graphical representation of the second audio service, wherein the graphical representation indicates that at least a portion of the particular authentication information is available from the application;
    detecting, via the graphical interface, a selection of the second audio service; and
    causing, by the computing device, the audio system to receive streaming music from the second audio service using the particular authentication information.

2. The method of claim 1, further comprising:
    after receiving the data indicating the second audio service added to the list of audio services, storing, by the computing device, data representing an updated list of audio services from which the audio system can receive streaming music, wherein the updated list of audio service includes at least (i) the first audio service and (ii) the second audio service.

3. The method of claim 1, wherein causing the audio system to receive streaming music from the second audio service using the particular authentication information further comprises:
    causing the audio system to receive the particular authentication information from the application; and
    causing the audio system to receive streaming music from the second audio service using the particular authentication information received from the application.

4. The method of claim 1, wherein causing the audio system to receive streaming music from the second audio service using the particular authentication information comprises:
    providing, for display on a graphical interface, a prompt to provide at least a portion of the particular authentication information;
    receiving, via the graphical interface, at least the portion of the particular authentication information; and
    causing the audio system to receive streaming music from the second audio service using at least the received portion of the particular authentication information.

5. The method of claim 1, wherein the particular authentication information comprises a combination of a username and password, and wherein providing, for display on the graphical interface, the graphical representation of the second audio service comprises causing the graphical interface to display an indication that one or more of: (i) the username, or (ii) the password is available from the application.

6. The method of claim 1, further comprising:
    before causing the audio system to receive streaming music from the second audio service using the particular authentication information, registering the second audio service with the audio system according to the particular authentication information.

7. The method of claim 1, wherein causing the audio system to receive streaming music from the second audio service using the particular authentication information comprises:
    receiving from the application an authentication token that indicates the particular authentication information; and
    causing the audio system to receive streaming music from the second audio service using the particular authentication information indicated by the authentication token.

8. The method of claim 1, further comprising:
    after causing the audio system to receive streaming music from the second audio service using the particular authentication information, causing the audio system to receive streaming music from the first audio service.

9. The method of claim 1, wherein the data indicating the second audio service added to the list of audio services comprises an updated list of audio services from which the audio system can receive streaming music, and wherein the updated list of audio services includes at least the second audio service.

10. The method of claim 1, further comprising:
    before causing the audio system to receive streaming music from the second audio service using the particular authentication information, determining that the application on the computing device is configured to receive streaming music from the second audio service using the particular authentication information.

11. The method of claim 10, wherein determining that the application on the computing device is configured to receive streaming music from the second audio service using particular authentication information comprises:
    determining a particular application identifier corresponding to the second audio service;
    comparing the particular application identifier against a list of computing device application identifiers, wherein each computing device application identifier in the list of application identifiers corresponds to an computing device application on the computing device; and
    determining that the particular application identifier matches one of the computing device application identifiers in the list of computing device application identifiers.

12. The method of claim 10, wherein determining that the application present on the computing device is configured to receive streaming music from the second audio service using particular authentication information comprises:
    determining a particular application identifier corresponding to the second audio service;
    based on the particular application identifier, executing a system call to request service associated with the application; and
    receiving a response to the executed system call, the response indicating that the application is present on the computing device.

13. A non-transitory computer readable medium having stored therein instructions executable by one or more processors to cause a computing device to perform operations comprising:
    maintaining (i) data representing a list of audio services from which an audio system can receive streaming music and (ii) data indicating that a first audio service is registered with the audio system, wherein the list of audio services includes at least the first audio service;
    receiving data indicating a second audio service added to the list of audio services, wherein an application on the computing device is configured to receive streaming music from the second audio service using particular authentication information;
    causing a graphical interface to display a graphical representation of the second audio service, wherein the graphical representation indicates that at least a portion of the particular authentication information is available from the application;
    detecting, via the graphical interface, input data indicating a selection of the second audio service; and
    causing the audio system to receive streaming music from the second audio service using the particular authentication information.

14. The non-transitory computer-readable medium claim 13, wherein the operations further comprise:
    after receiving the data indicating the second audio service added to the list of audio services, store data representing an updated list of audio services from which the audio system can receive streaming music, wherein the updated list of audio service includes at least (i) the first audio service and (ii) the second audio service.

15. The non-transitory computer-readable medium of claim 13, wherein causing the audio system to receive streaming music from the second audio service using the particular authentication information further comprises:
    causing the audio system to receive the particular authentication information from the application; and
    causing the audio system to receive streaming music from the second audio service using the particular authentication information received from the application.

16. The non-transitory computer-readable medium of claim 13, wherein causing the audio system to receive streaming music from the second audio service using the particular authentication information comprises:
    provide a prompt to provide at least a portion of the particular authentication information;
    receive, via the graphical interface, at least the portion of the particular authentication information; and
    cause the audio system to receive streaming music from the second audio service using at least the received portion of the particular authentication information.

17. The non-transitory computer-readable medium of claim 13, wherein the particular authentication information comprises a combination of a username and password, and wherein providing, for display on the graphical interface, the graphical representation of the second audio service comprises causing the graphical interface to display an indication that one or more of: (i) the username, or (ii) the password is available from the application.

18. The non-transitory computer-readable medium of claim 13, wherein the data indicating the second audio service added to the list of audio services comprises an updated list of audio services from which the audio system can receive streaming music, and wherein the updated list of audio services includes at least the second audio service.

19. The non-transitory computer-readable medium of claim 13, wherein the operations further comprise before causing the audio system to receive streaming music from the second audio service using the particular authentication information, determining that the application on the computing device is configured to receive streaming music from the second audio service using the particular authentication information.

20. A computing device comprising:
    a graphical interface;
    a network interface;
    at least one processor;
    a data storage; and
    a program logic stored in the data storage and executable by the at least one processor to:
        maintain, by a computing device, (i) data representing a list of audio services from which an audio system can receive streaming music and (ii) data indicating that a first audio service is registered with the audio system, wherein the list of audio services includes at least the first audio service;
        receive, by the computing device, data indicating a second audio service added to the list of audio services, wherein an application on the computing device is configured to receive streaming music from the second audio service using particular authentication information;
        cause the graphical interface to display a graphical representation of the second audio service, wherein the graphical representation indicates that at least a portion of the particular authentication information is available from the application;
        detect, via the graphical interface, a selection of the second audio service; and cause, by the computing device, the audio system to receive streaming music from the second audio service using the particular authentication information.

* * * * *